(12) United States Patent
Martínez Sanz et al.

(10) Patent No.: US 8,607,780 B2
(45) Date of Patent: Dec. 17, 2013

(54) EXPANSION COMPENSATION DEVICE AND METHOD FOR MANUFACTURE THEREOF

(75) Inventors: Noelia Martínez Sanz, Seville (ES); Javier Asensio Pérez Ullivarri, Seville (ES); Pablo José Bombin Ortega, Seville (ES); Javier Peláez Fombellida, Seville (ES); José Ángel Rico Sánchez, Seville (ES); Miguel Ángel Girona Montarroso, Seville (ES)

(73) Assignee: Abengoa Solar New Technologies, S.A., Seville (ES)

( * ) Notice: Subject to any disclaimer, the term of this patent is extended or adjusted under 35 U.S.C. 154(b) by 0 days.

(21) Appl. No.: 13/509,274

(22) PCT Filed: Nov. 11, 2010

(86) PCT No.: PCT/ES2010/000455
§ 371 (c)(1),
(2), (4) Date: Jul. 31, 2012

(87) PCT Pub. No.: WO2011/098622
PCT Pub. Date: Aug. 18, 2011

(65) Prior Publication Data
US 2012/0299289 A1 Nov. 29, 2012

(30) Foreign Application Priority Data
Nov. 12, 2009 (ES) .................................. 200902157

(51) Int. Cl.
*F24J 2/24* (2006.01)

(52) U.S. Cl.
USPC ........... 126/651; 126/652; 126/653; 285/226; 285/227; 285/228; 285/229

(58) Field of Classification Search
USPC .......... 126/651–653, 657; 285/226–229, 299, 285/145.5, 300; 403/50; 74/18; 277/634
See application file for complete search history.

(56) References Cited

U.S. PATENT DOCUMENTS 3,051,515 A * 8/1962 Graves .......................... 285/228
4,326,502 A * 4/1982 Radenkovic .................. 126/685
4,703,749 A * 11/1987 Morse ........................... 126/591

(Continued)

FOREIGN PATENT DOCUMENTS

CN 101245954 8/2008

OTHER PUBLICATIONS

IPRP/WO for related PCT/ES2010/000455 issued on May 15, 2012.
ISR for related PCT/ES2010/000455 mailed on Mar. 23, 2011.

*Primary Examiner* — Kenneth Rinehart
*Assistant Examiner* — Jason Lau
(74) *Attorney, Agent, or Firm* — Ladas & Parry, LLP

(57) ABSTRACT

New expansion compensating device and manufacturing method of the same, of those used in solar power absorber tubes featuring a dual bellows design where the height of the waves of the bellows is not regular, but the second wave is greater (where it supports more load) and diminishes towards the ends. With this design improving the performance of the receiver is achieved because it shortens the length of the device and consequently there is more surface area receiving solar radiation as well as it decreases the necessary diameter of glass tube and therefore its cost.

15 Claims, 3 Drawing Sheets

(56) References Cited

U.S. PATENT DOCUMENTS

| | | |
|---|---|---|
| 6,705,311 B1 | 3/2004 | Schwartzman et al. |
| 7,013,887 B2 | 3/2006 | Kuckelkorn et al. |
| 7,552,726 B2 * | 6/2009 | Kuckelkorn et al. .......... 126/653 |
| 2003/0102666 A1 * | 6/2003 | Huber ........................ 285/288.1 |
| 2004/0050381 A1 * | 3/2004 | Kuckelkorn et al. .......... 126/690 |
| 2007/0034204 A1 | 2/2007 | Kuckelkorn et al. |

* cited by examiner

EXPANSION COMPENSATION DEVICE AND METHOD FOR MANUFACTURE THEREOF

CROSS-REFERENCE TO RELATED APPLICATIONS:

This application is the U.S. National Stage of International Patent Application No. PCT/ES2010/000455 filed on Nov. 11, 2010, which claims priority to Spanish Patent Application No. P200902157 filed on Nov. 12, 2009, the disclosures of which are hereby incorporated by reference in their entireties.

TECHNICAL FIELD OF THE INVENTION

The present invention describes an expansion compensating device of those used in high concentration solar energy receiving tubes.

BACKGROUND OF THE INVENTION

The general principle of solar thermal technology is based on the concept of the concentration of solar radiation to produce generally steam, which is then used in standard power plants.

Solar energy collection, which has a relatively low density, is one of the greatest challenges in the development of solar thermal power plants. There are two types of solar concentrators: linear concentrators and point concentrators. Linear concentration is easier to install since it has fewer degrees of freedom, but it has a lower concentration factor and therefore it can reach lower temperatures than point concentration technology.

That is why an effort is made in order to progress in the development of the receiving tubes used in linear concentration, to try to increase the collection efficiency thereof and reduce thermal losses, such that the overall performance of the concentration plant increases.

The invention before us revolves around one of the elements that are part of said receiving tubes in particular, it is the expansion compensating device.

In general, a receiving tube consists of two concentric tubes between which the vacuum is produced. The inner tube, through which the fluid that is heated flows, is made of metal and the outer tube is made of glass, usually borosilicate.

The element described here, the expansion compensating device, is placed between both tubes so that it allows the movement of the tubes lengthwise and ensures the vacuum, absorbing the stresses created by the difference between the coefficients of thermal expansion of metal and glass.

In the state of the art several developments for this element are known, but the one that offers the best results is disclosed by SCHOTT in the patent U.S. Pat. No. 7,013,887. In said document the expansion compensating element consists of a folding bellows that binds to the metal tube by a connection element and to the glass tube by a glass-metal transition element.

Said connection device has a number of drawbacks. One of them is the decrease in the performance of the system because a longer or shorter glass tube portion is covered inside by this bellows, such that no solar radiation penetrates the metal tube.

Another drawback is derived from the height of the waves of the bellows. The height of these waves is what determines the diameter that the borosilicate tube should have, because the expansion compensating device is located inside of it. Therefore, the greater they are, a greater tube diameter is required, which makes the product more expensive and increases heat losses.

Therefore, the present invention is intended to devise a new compensating device that meets the requirements for this type of elements and at the same time improves its performance with a view to the existing products on the market.

DESCRIPTION OF THE INVENTION

The invention consists of designing a new compensating device for receiving tubes that solves the differences observed in those existing so far.

The new device consists of a bellows, as those existing in the state of the art, but in which the simple wave has been replaced by a double wave also having an asymmetrical distribution of these.

With the use of the double wave, decreasing the necessary length of the device up to a 40% of what is known so far is achieved, with the consequent gain in length of the glass tube through which solar radiation penetrates and therefore a considerable increase in the amount of solar radiation that reaches the metal absorber tube and in the performance of the entire system.

The device thus designed, would occupy 36% less than the current one which means that approximately 2% of the total length of the tube is covered and the sun does not penetrate it, against 4% that is covered with the devices used so far.

Thanks to this, an increase of thermal efficiency of between 0.8 and 0.9% is achieved in the collector.

Therefore, for a typical loop of parabolic cylinder collector of 50 MWe composed of 144 tubes the fluid temperature gain would be of between 0.95 and 1.2° C.

Another of the changes that has been made has been reducing the height of the waves of the bellows going from a height of 52.8 mm in the existing tubes to a height of 34 mm in the new development, which entails a reduction in height of 35.6%.

Another of the improvements that have been studied is to vary the distribution of waves of the bellows. That is, it has been found that the wave that works the most is the second wave closest to the lid and it is there where a greater height is required, because it is unnecessary for all waves of the bellows to have the maximum height, a bellows having shorter waves at the ends and larger central waves can be manufactured, in this way, the diameter of the glass tube can be reduced keeping the same properties in the connection device. This decrease in the diameter of the glass tube translates into savings of borosilicate material, lower cost in the generation of vacuum and lower heat losses.

Therefore, with this new design increasing the heat concentration performance in the absorber tube has been achieved, as well as reducing the size and cost of manufacture of the tube.

DESCRIPTION OF THE DRAWINGS

To complete the description that is being carried out and in order to help to a better understanding of the invention, it is accompanied by a set of drawings where, with an illustrative character and without limitation, the following has been represented.

PREFERRED EMBODIMENT OF THE INVENTION

To facilitate the understanding of the invention the expansion compensating device according to a preferred embodiment will be described next.

Figure 1:
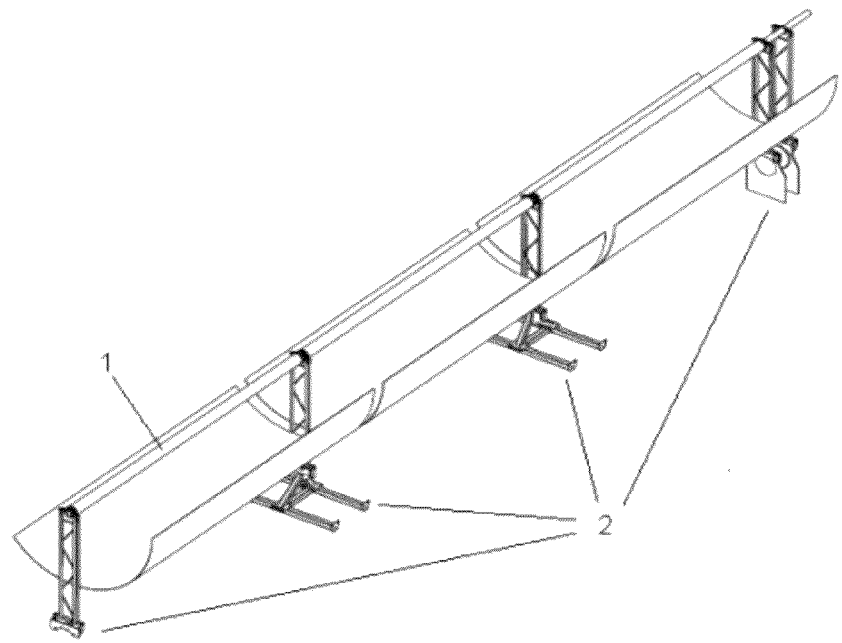
FIG. 1: General view of a solar energy receiving tube

First and according to what is observed in FIG. 1, the expansion compensating device is part of a solar energy receiving tube (1) as the one shown in said figure. These tubes (1) usually have an approximate length of 4 meters and are placed at the linear focus of a parabolic cylinder collector by means of supports (2) as it is shown in the figure, in this way, the height of the tube with respect to the ground varies with the sun tracking by the collector, being in a range of 4 to 5.5 m.

Figure 2:
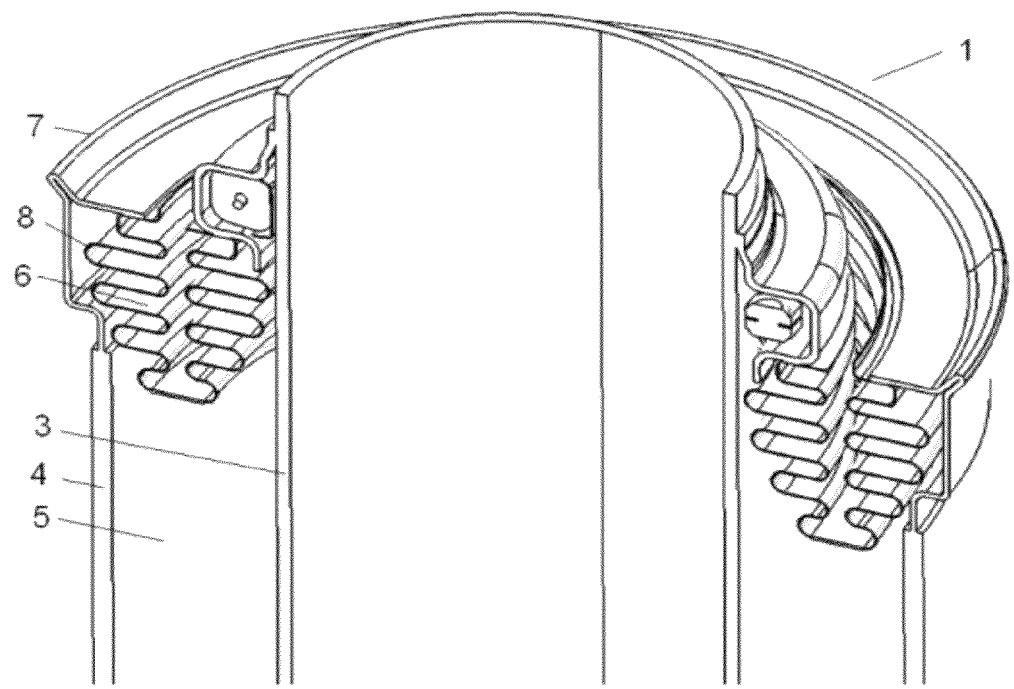
FIG. 2: Section of the receiving tube

Deepening a little more in the structure of a receiving tube (1) and with the help of FIG. 2, we see that the tube (1) is usually formed by a metal tube (3) by the interior of which circulates the heat-transfer fluid. This tube (3) is surrounded by a glass cover (4) usually borosilicate and leaving a space with vacuum (5) between both tubes. In this space (5) the vacuum is produced to prevent heat losses. In each of the ends of the tube (1) the expansion compensating devices (6) are placed in the form of double bellows, which are responsible for compensating the difference of coefficients of thermal expansion existing between glass (4) and (3) metal, allowing movements lengthwise. The tube ends with a piece (7) in the form of a lid.

Figure 3:
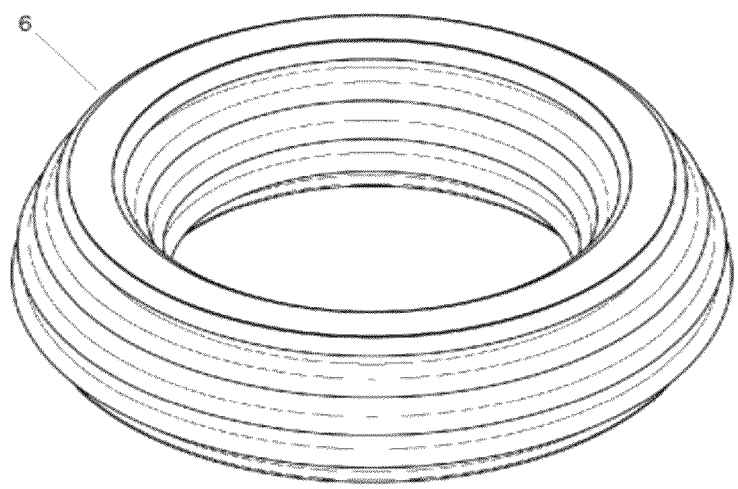
FIG. 3: Isometric view of the expansion compensating device
Figure 4:
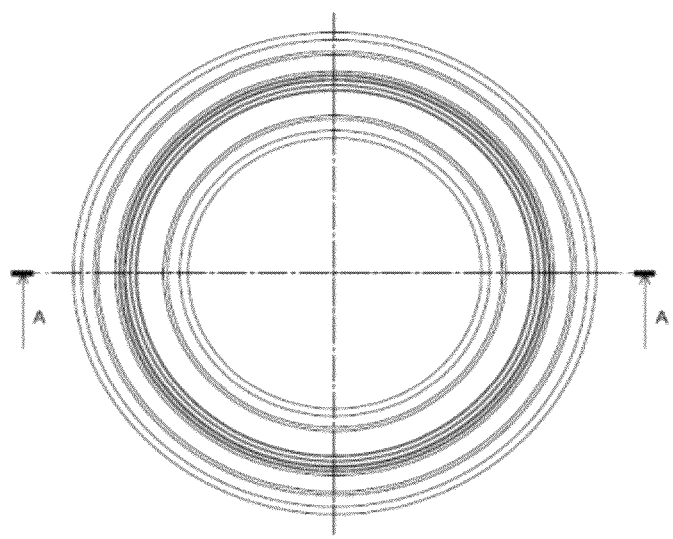
FIG. 4: Plant view of the expansion compensating device
Figure 5:
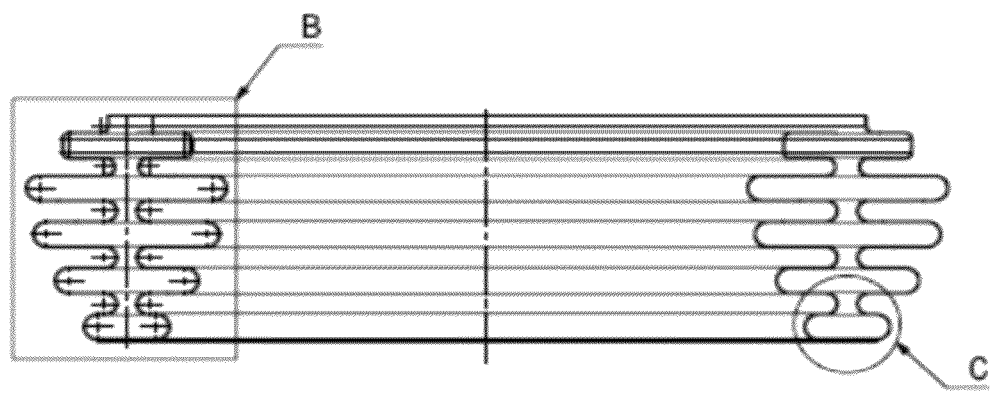
FIG. 5: Section A of FIG. 4
FIG. 6: Detail B of FIG. 5
FIG. 7: Detail C of FIG. 5

FIGS. 3, 4 and 5 show different views of the device (6) of the invention.

FIG. 3 corresponds to an isometric view, FIG. 4 to a plant view and FIG. 5 to a section of the expansion compensating device.

Figure 6:
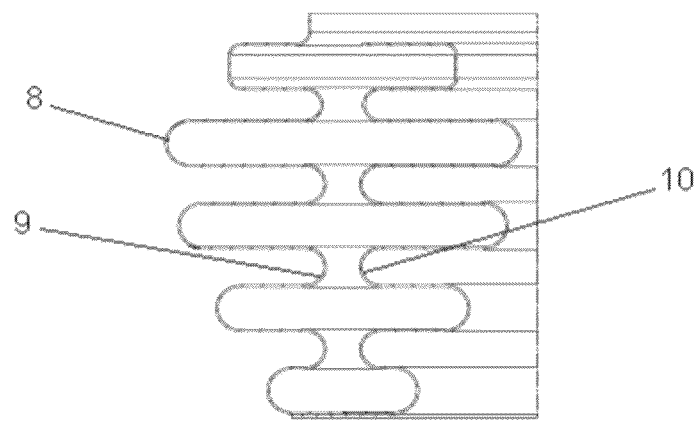

FIG. 6 shows detail B of the device. Here it is verified that it is designed with a double bellows, such that the waves of the outer bellows (9) are faced with the glass tube (4) and the waves of the inner bellows (10) are faced with the metal tube (3).

The asymmetric distribution in heights that the waves have is also observed, the second wave (8) closer to the lid (7) being greater, since it is the one that supports to a greater extent the efforts and the height decreases towards the waves of the ends. This design of difference of height in waves and the arrangement of these from lesser to greater length allows reducing the diameter of the borosilicate tube (4) since the last wave of the bellows is the one that determines the diameter of the tube. Since this is the one with the smaller size it allows the diameter of the borosilicate tube of this invention to be lesser than those currently used, with the consequent economic savings.

Figure 7:
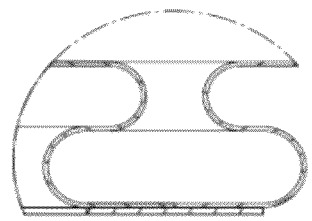
Figure 8:
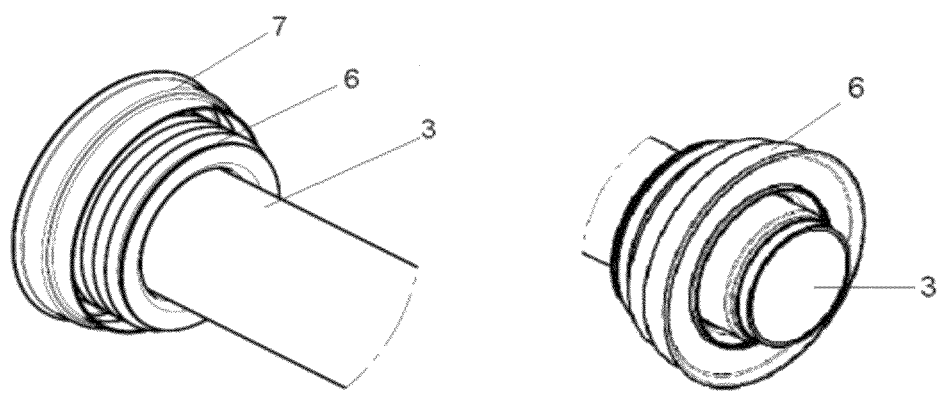
FIG. 8: Detail of the assembly of the expansion compensating device in the tube

FIG. 7 contains detail C that was noted in FIG. 5. It shows how the finish of one end of the device (6) is made. The manufacturing process of the expansion compensating device consists of the manufacture of two concentric bodies using the hydroforming technique. It is basically a forming process of a material (usually a metal) by the action of a fluid at high pressure. The most common application consists of forming a steel tube against the walls of a matrix which has the shape of bellows, through the introduction of a fluid at high pressure forming. A simultaneous axial compression can be used in addition to avoid an excessive thinning of the thickness of the tube in the areas undergoing strong expansion. Both pieces thus obtained are welded by microplasma to a metal ring of the same material to define the final assembly of the expansion compensating mechanism.

The invention claimed is:

1. An expansion compensator adapted for use with solar energy receiving tubes comprising:
   two opposing symmetrically arranged bellows, each bellows having an asymmetric distribution of waves, each wave having a height, wherein:
     the second wave counting from an end of the expansion compensator closest to a lid of the receiving tube is the largest, and
     the height of succeeding waves decreases in comparison to an immediately preceding wave as each end of the bellows is approached.

2. The expansion compensator of claim 1, wherein the waves of the bellows have a maximum height of 34 mm.

3. The expansion compensator of claim 1, wherein the expansion compensator has a length and the receiving tube has a total length, the length of the expansion compensator being less than 2% of the total length of the receiving tube.

4. The expansion compensator of claim 1, wherein the two opposing symmetrical arranged bellows are arranged concentrically.

5. The expansion compensator of claim 1, wherein the two opposing symmetrical bellows are attached to one another at only one point.

6. The expansion compensator of claim 1, wherein the symmetrical arrangement occurs between the waves of the different bellows in a cross-section of the expansion compensator.

7. A solar energy receiving tube comprising an outer tube and an inner tube, wherein the inner tube is connected to the outer tube with the expansion compensator of claim 1.

8. An expansion compensator for use with concentric tubing comprising:
   a double bellows comprising an inner and an outer bellows, the inner bellows having an inner wave section and the outer bellows having an outer wave section, the inner and outer bellows each having a first end and a second end and each wave section comprising a number of convolutions arranged as a series of waves, wherein, the inner and outer wave section each have an axial and a radial dimension, each convolution having a height in the radial dimension of the corresponding wave section;
   wherein the convolutions on each wave section have a distribution of heights, with the second convolution from the first end of each bellows having the greatest height of the wave section, and the other convolutions of each wave section having lesser height.

9. The expansion compensator of claim 8, wherein the height of successive convolutions of each wave section decreases as the first and second end of each bellows is approached from the second convolution.

10. The expansion compensator of claim 8, wherein the inner and outer bellows are connected at their second ends.

11. The expansion compensator of claim 8, wherein the waves on each wave section have an asymmetric distribution of heights.

12. The expansion compensator of claim 8, wherein the convolutions of the inner wave section correspond to the convolutions of the outer wave section along the axial dimension.

13. The expansion compensator of claim 12, wherein corresponding convolutions of the inner and outer wave sections are directed in opposite directions.

14. A solar energy receiving tube comprising an outer tube and an inner tube, wherein the inner tube is connected to the outer tube with the expansion compensator of claim 8.

15. The solar energy receiving tube, further comprising a lid attached to an end of the outer tube, wherein the first end of each wave section is closer to the lid than the respective second end.

\* \* \* \* \*